(12) United States Patent
Kim et al.

(10) Patent No.: US 11,197,298 B2
(45) Date of Patent: Dec. 7, 2021

(54) APPARATUS AND METHOD FOR SELECTING BEST BEAM IN WIRELESS COMMUNICATION SYSTEM

(71) Applicant: Samsung Electronics Co., Ltd., Suwon-si (KR)

(72) Inventors: Tae-Young Kim, Seongnam-si (KR); Hyun-Kyu Yu, Yongin-si (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/881,603

(22) Filed: May 22, 2020

(65) Prior Publication Data

US 2020/0288454 A1    Sep. 10, 2020

Related U.S. Application Data

(63) Continuation of application No. 15/480,004, filed on Apr. 5, 2017, now Pat. No. 10,667,268, which is a (Continued)

(30) Foreign Application Priority Data

Sep. 1, 2011 (KR) .......................... 10-2011-0088441

(51) Int. Cl.
*H04B 7/0417* (2017.01)
*H04W 72/04* (2009.01)
(Continued)

(52) U.S. Cl.
CPC .......... *H04W 72/048* (2013.01); *H04B 7/063* (2013.01); *H04B 7/0617* (2013.01);
(Continued)

(58) Field of Classification Search
CPC .. H04B 7/0617; H04B 7/0695; H04B 7/0408; H04B 7/061; H04B 7/043; H04B 7/0619;
(Continued)

(56) References Cited

U.S. PATENT DOCUMENTS

| | | | |
|---|---|---|---|
| 5,894,598 A | 4/1999 | Shoki | |
| 2002/0146983 A1* | 10/2002 | Scherzer | H04W 16/28 455/67.11 |

(Continued)

FOREIGN PATENT DOCUMENTS

| | | |
|---|---|---|
| CN | 101243699 A | 8/2008 |
| JP | 2011-519502 A | 7/2011 |

(Continued)

OTHER PUBLICATIONS

Korean Office Action dated Dec. 13, 2017, issued in the Korean Application No. 10-2011-0088441.
(Continued)

*Primary Examiner* — Tu X Nguyen
(74) *Attorney, Agent, or Firm* — Jefferson IP Law, LLP

(57) ABSTRACT

An apparatus and method for selecting the best beam in a wireless communication system are provided. An operation of a Base Station (BS) includes repeatedly transmitting reference signals beamformed with a first width, receiving a feedback signal indicating at least one preferred-beam having the first width from at least one terminal, determining a direction range within which reference signals beamformed with a second width are to be transmitted and a transmission pattern, based on the at least one preferred-beam having the first width, repeatedly transmitting the reference signals beamformed with the second width within the determined direction range according to the transmission pattern, and receiving a feedback signal indicating at least one preferred-beam having the second width from the at least one terminal.

20 Claims, 11 Drawing Sheets

Related U.S. Application Data continuation of application No. 14/942,260, filed on Nov. 16, 2015, now Pat. No. 9,736,848, which is a continuation of application No. 13/591,610, filed on Aug. 22, 2012, now Pat. No. 9,191,957.

(51) Int. Cl.
  *H04B 7/06* (2006.01)
  *H04L 5/00* (2006.01)
  *H04W 88/08* (2009.01)

(52) U.S. Cl.
  CPC ......... *H04B 7/0695* (2013.01); *H04L 5/0051* (2013.01); *H04W 72/046* (2013.01); *H04W 88/08* (2013.01)

(58) Field of Classification Search
  CPC .......... H04B 7/088; H04B 17/24; H04B 7/04; H04B 7/0421; H04B 2001/0433; H04B 7/0665; H04W 16/28; H04W 72/046; H04W 74/0833; H04W 74/0891; H04L 2027/0095
  See application file for complete search history.

(56) References Cited

U.S. PATENT DOCUMENTS

| | | |
|---|---|---|
| 2004/0014429 A1 | 1/2004 | Guo |
| 2005/0113116 A1 | 5/2005 | Avidor et al. |
| 2005/0136981 A1 | 6/2005 | Rensburg et al. |
| 2006/0286974 A1 | 12/2006 | Gore et al. |
| 2008/0261658 A1 | 10/2008 | Jin et al. |
| 2009/0143073 A1 | 6/2009 | Hovers et al. |
| 2009/0189812 A1 | 7/2009 | Xia et al. |
| 2009/0231194 A1 | 9/2009 | Uno et al. |
| 2009/0232240 A1 | 9/2009 | Lakkis |
| 2009/0238156 A1 | 9/2009 | Yong et al. |
| 2009/0298502 A1 | 12/2009 | Hagerman et al. |
| 2010/0014463 A1* | 1/2010 | Nagai ............... H04W 72/0426 370/328 |
| 2011/0007685 A1 | 1/2011 | Ma et al. |
| 2011/0287796 A1* | 11/2011 | Jain ..................... H04B 7/0695 455/509 |
| 2017/0339621 A1* | 11/2017 | Wang .................... H04W 88/02 |

FOREIGN PATENT DOCUMENTS

| | | |
|---|---|---|
| KR | 102010-0107066 A | 10/2010 |
| WO | 2010/123237 A1 | 10/2010 |

OTHER PUBLICATIONS

Korean Notice of Patent Grant dated Feb. 22, 2018, issued in the Korean Application No. 10-2011-0088441.
Indian Examination Report dated Dec. 21, 2018, issued in Indian Application No. 693/KOLNP/2014.
European Office Action dated Jan. 29, 2020, issued in a counterpart European Application No. 12 826 840.6-1215.
Canadian Office Action dated Jul. 20, 2017, issued in the Canadian Application No. 2,846,830.
Japanese Notice of Patent Grant dated Aug. 21, 2017, issued in the Japanese Application No. 2014-528269.

* cited by examiner

APPARATUS AND METHOD FOR SELECTING BEST BEAM IN WIRELESS COMMUNICATION SYSTEM

PRIORITY

This application is a continuation application of prior application Ser. No. 15/480,004, filed on Apr. 5, 2017, which will be issued as U.S. Pat. No. 10,667,268 on May 26, 2020; which is a continuation application of prior application Ser. No. 14/942,260, filed on Nov. 16, 2015, which has issued as U.S. Pat. No. 9,736,848 on Aug. 15, 2017; which is a continuation application of prior application Ser. No. 13/591,610, filed on Aug. 22, 2012, which issued as U.S. Pat. No. 9,191,957 on Nov. 17, 2015, and which claims the benefit under 35 U.S.C. § 119(a) of a Korean patent application filed on Sep. 1, 2011 in the Korean Intellectual Property Office and assigned Serial number 10-2011-0088441, the entire disclosure of each of which is hereby incorporated by reference.

BACKGROUND OF THE INVENTION

1. Field of the Invention

The present invention relates to a wireless communication system. More particularly, the present invention relates to an apparatus and method for selecting the best beam in a wireless communication system which is performing beam forming.

2. Description of the Related Art

To meet the ever-increasing demand for wireless data traffic, a wireless communication system is being developed to support a higher data transmission rate. To increase a data transmission rate, a 4th-Generation (4G) system that is now being commercialization pursued technology development mainly to improve spectral efficiency. However, it has become difficult to meet the explosively increasing demand of wireless data traffic with only the spectral efficiency improvement technology.

A way for solving the above problem is using a very wide frequency band. A frequency band presently used in a mobile communication cellular system is generally 10 Giga Hertz (GHz) or less, and there is a great difficulty in securing a wide frequency band. Accordingly, there is a need to secure a broadband frequency at a higher frequency band. However, as a frequency for wireless communication increases, a propagation path loss increases. Due to this, a wave reach distance becomes relatively short, thereby causing a decrease of service coverage. One technology for solving this (i.e., for decreasing the propagation path loss to increase the wave reach distance) is a beamforming technology.

The beamforming can be divided into transmit beamforming and receive beamforming. The transmit beamforming generally concentrates wave reach coverage on a specific direction using a plurality of antennas. Generally, a form of gathering the plurality of antennas is called an antenna array, and an individual antenna included in the antenna array is called an array element. If the transmit beamforming is applied, a signal transmission distance increases and simultaneously, a signal is concentrated in an intended direction (e.g., a signal is almost not transmitted in directions other than an intended direction). Accordingly, there is an advantage in which interference in other users greatly decreases.

The receive beamforming concentrates wave reception on a specific direction using a reception antenna array at reception side. Consequently, the sensitivity of a signal received in an intended direction is increased and, by excluding a signal coming in directions other than the intended direction, an interfering signal is cut off.

As described above, the introduction of a very high frequency (i.e., millimeter (mm)) wave system is expected to secure a wide frequency band. In this case, to overcome a propagation path loss, a beamforming technology is being taken into consideration. Accordingly, there should be proposed an alternative for effectively performing beamforming under a mobile communication environment in which users travel and a propagation environment changes.

Therefore, a need exists for an apparatus and method for performing effective beamforming in a wireless communication system. In addition, a need exists for an alternative for decreasing a system overhead and simultaneously obtaining a sufficient antenna gain suitably using various beam patterns.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for performing effective beamforming in a wireless communication system.

Another aspect of the present invention is to provide an apparatus and method for selecting the best beam in a wireless communication system.

A further aspect of the present invention is to provide an apparatus and method for minimizing a signaling overhead for selection of the best beam in a wireless communication system.

The above aspects are achieved by providing an apparatus and method for selecting the best beam in a wireless communication system.

According to an aspect of the present invention, an operation method of a Base Station (BS) in a wireless communication system is provided. The method includes repeatedly transmitting reference signals beamformed with a first width, receiving a feedback signal indicating at least one preferred-beam having the first width from at least one terminal, determining a direction range within which reference signals beamformed with a second width are to be transmitted and a transmission pattern, based on the at least one preferred-beam having the first width, repeatedly transmitting the reference signals beamformed with the second width within the determined direction range according to the transmission pattern, and receiving a feedback signal indicating at least one preferred-beam having the second width from the at least one terminal. The first width is greater than the second width.

According to another aspect of the present invention, an operation method of a terminal in a wireless communication system is provided. The method includes measuring a reception signal strength for reference signals beamformed with a first width which are received from a BS, transmitting a feedback signal indicating a preferred-beam having the first width, to the BS, determining transmission patterns of reference signals beamformed with a second width corresponding to the direction of the preferred-beam having the first width of the at least one terminal having accessed the BS, measuring a reception signal strength for the reference signals beamformed with the second width which are received according to the determined transmission patterns, and transmitting a feedback signal indicating a preferred-beam having the second width, to the BS. The first width is greater than the second width.

According to a further another aspect of the present invention, a BS apparatus in a wireless communication system is provided. The apparatus includes a beamforming unit, a receiver, and a controller. The beamforming unit beamforms reference signals with a beam having a first width and a beam having a second width. The receiver receives a feedback signal indicating at least one preferred-beam having a first width and a feedback signal indicating at least one preferred-beam having a second width from at least one terminal. The controller controls to repeatedly transmit the reference signals beamformed with the first width, if receiving the feedback signal indicating at least one preferred-beam having the first width from the at least one terminal, determine a direction range within which reference signals beamformed with a second width are to be transmitted and a transmission pattern depending on the at least one preferred-beam having the first width, and to repeatedly transmit the reference signals beamformed with the second width within the determined direction range according to the transmission pattern. The first width is greater than the second width.

According to a yet another aspect of the present invention, a terminal apparatus in a wireless communication system is provided. The apparatus includes a modem, a controller, and a transmitter. The modem measures a reception signal strength for reference signals beamformed with a first width which are received from a BS, and measures a reception signal strength for reference signals beamformed with a second width which are received from the BS according to transmission patterns of the reference signals beamformed with the second width. The controller controls to determine a preferred-beam having the first width based on the reception signal strength for the reference signals beamformed with the first width, determine the transmission patterns of the reference signals beamformed with the second width corresponding to the direction of the preferred-beam having the first width of the at least one terminal having accessed the BS, and determine the preferred-beam having the second width based on the reception signal strength for the reference signals beamformed with the second width. The transmitter transmits a feedback signal indicating the preferred-beam having the 1st width a feedback signal indicating the preferred-beam having the second width, to the BS. The first width is greater than the second width.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will become more apparent from the following description when taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for selecting the best beam in a wireless communication system according to exemplary embodiments of the present invention is described below. As an example, the following description is made for an Orthogonal Frequency Division Multiplexing/Orthogonal Frequency Division Multiple Access (OFDM/OFDMA) wireless communication system.

According to exemplary embodiments of the present invention, a cellular system operating at a very high frequency band decreases a high propagation path loss by virtue of an antenna gain obtained through a beamforming technology. The beamforming technology is a technique for transmitting signals from a plurality of antennas so that the signals can be gathered to a specific direction. For this, a transmit end adjusts a phase of a signal transmitted from every each antenna, thereby concentrating the signals transmitted from all of the antennas on the specific direction and as a result, the transmit end is able to obtain a high antenna gain. A variable related to the antenna gain is the number of antennas used for transmitting the signals. As the number of antennas increases, an antenna gain can be increasingly obtained. As the number of antennas increases, a beam pattern or beam width formed by the multiple antennas gets narrower. For example, signals transmitted from the plurality of antennas are more intensively gathered to a specific direction, whereby a high antenna gain is obtained.

Figure 1:
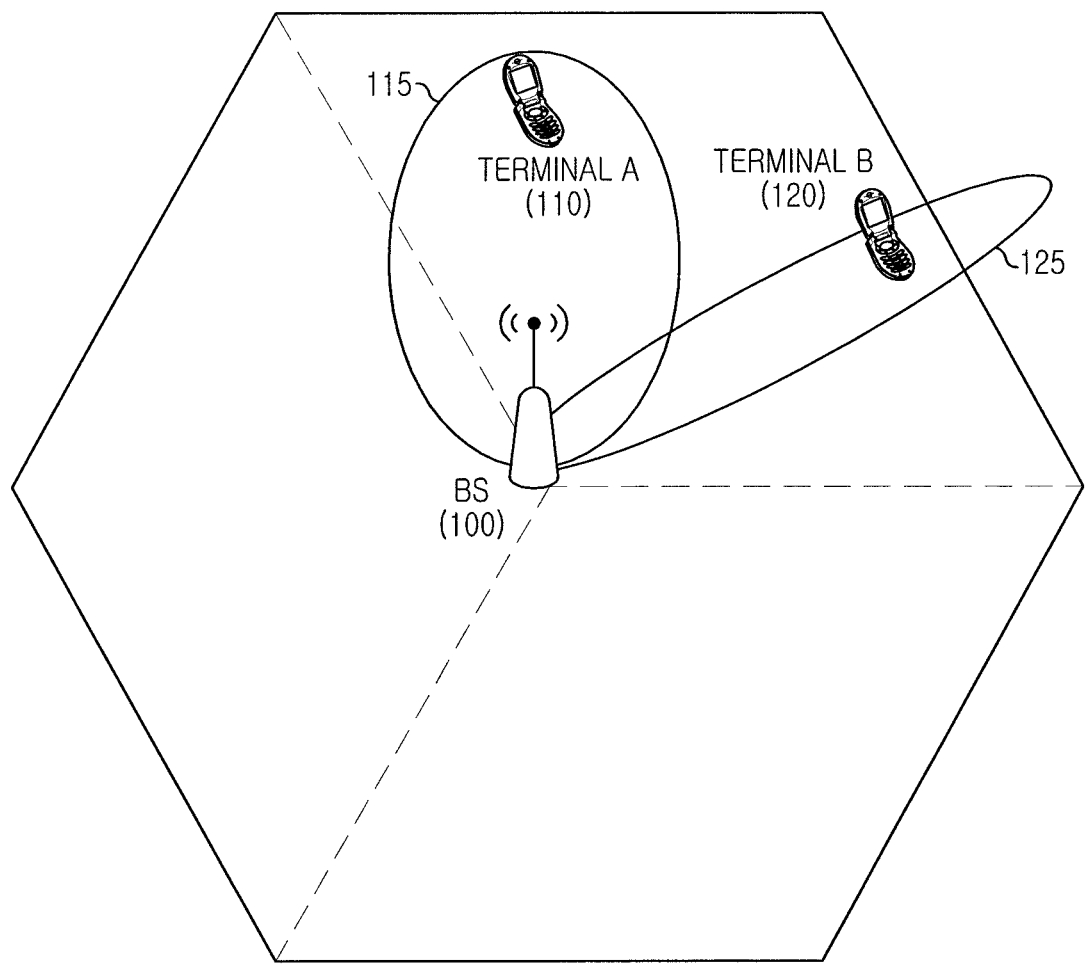
FIG. 1 is a diagram illustrating an example of a beam pattern in a wireless communication system according to an exemplary embodiment of the present invention.

FIG. 1 illustrates an example of a beam pattern in a wireless communication system according to an exemplary embodiment of the present invention.

Referring to FIG. 1, a Base Station (BS) 100 is illustrated as transmitting a signal to a terminal A 110 and a terminal B 120. According to exemplary embodiments of the present invention, BS 100 transmits the signal to terminal A 110 using a fewer number of antennas relative to the number of antennas that the BS 100 uses for transmitting the signal to terminal B 120. If BS 100 transmits a signal using fewer antennas, a beam of a wide beam width is formed like a beam pattern 115 formed toward a terminal A 110. In such an example, because the signal is forwarded in a wide direction, an antenna gain in a specific direction is not high. In contrast, if the BS 100 transmits a signal using many antennas, a beam of a narrow beam width is formed like a beam pattern 125 formed toward a terminal B 120. In such an example, because a signal is not propagated in directions other than a specific direction, a high antenna gain is expected.

In a case of constructing antennas to provide a wide beam width like the beam pattern 115, an antenna gain is low but it can support a wide direction, so there is an advantage of decreasing a system overhead necessary for beam acquisition. In contrast, in a case of constructing antennas to provide a narrow beam width like the beam pattern 125, a high antenna gain is expected but a serviceable area is small because of the narrow beam width, so there is a disadvantage of increasing a system overhead necessary for beam acquisition. Accordingly, there is a need for an alternative for decreasing a system overhead and simultaneously obtaining a sufficient antenna gain suitably using various beam patterns.

A cellular system using a very high frequency band suffers large propagation path damage due to a frequency characteristic. Accordingly, the cellular system guarantees sufficient antenna gains for all of a control signal and a data signal. For this, a beam acquisition procedure for determining the best beam between a BS and a terminal is performed.

Figure 2:
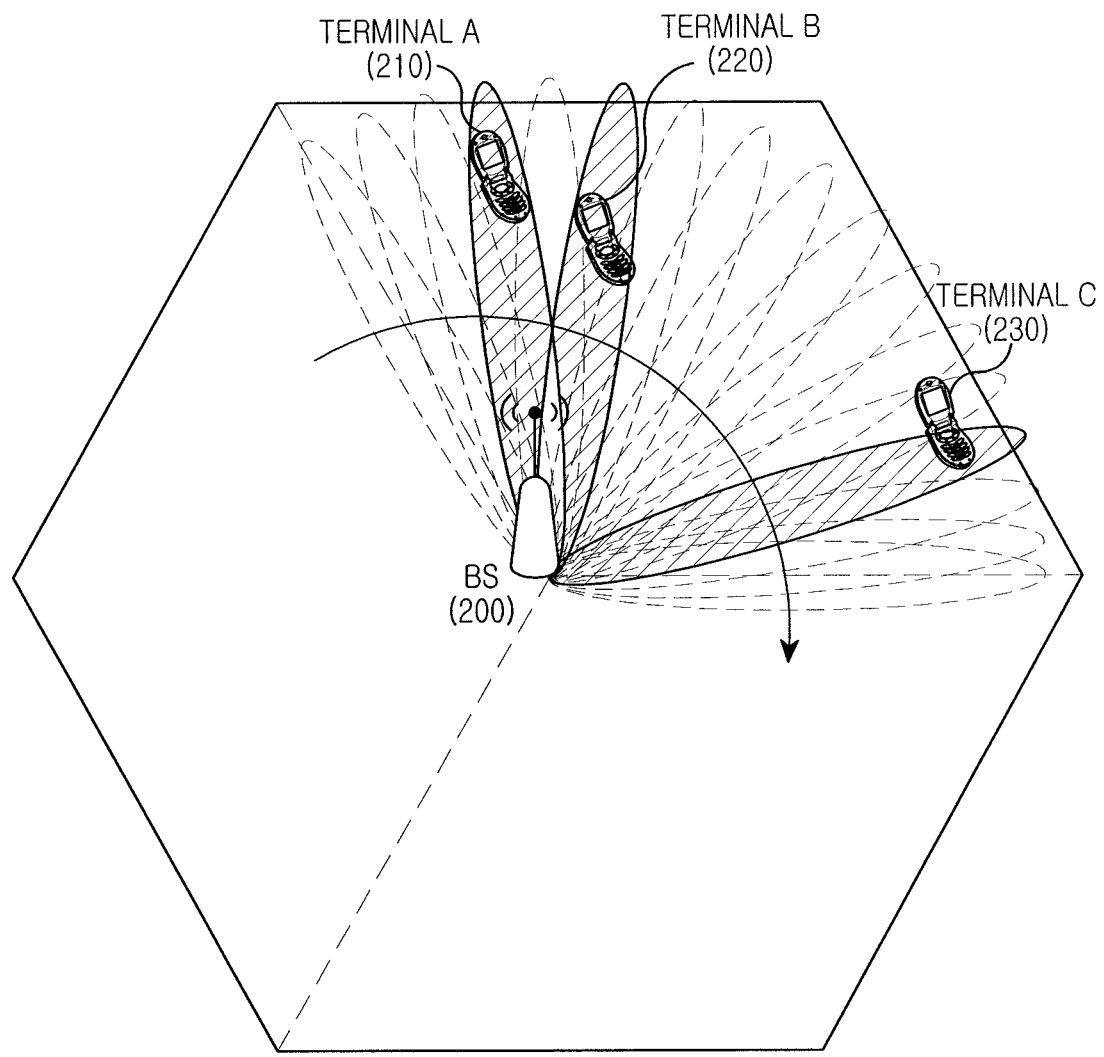
FIG. 2 is a diagram schematically illustrating a beam acquisition procedure using only a narrow beam in a wireless communication system according to an exemplary embodiment of the present invention.

FIG. 2 schematically illustrates a beam acquisition procedure using only a narrow beam in a wireless communication system according to an exemplary embodiment of the present invention.

Referring to FIG. 2, a terminal A 210, a terminal B 220, and a terminal C 230 are located within one sector. A BS 200 beamforms reference signals to narrow beams, and repeatedly transmits a plurality of reference signals in all directions within the sector. For example, the BS 200 multiplexes and transmits a plurality of narrow beams heading toward different directions within the sector in a time or frequency division scheme. For example, the BS 200 turns a beam direction in the direction of an arrow illustrated in FIG. 2 while sequentially transmitting reference signals beamformed with narrow beams. The terminals 210, 220, and 230 each receive reference signals repeatedly transmitted through resources of a corresponding time duration or frequency duration, and measure reception signal strengths for the respective reference signals. The terminals 210, 220, and 230 each select transmission beams having the maximum signal strengths, and notify the BS 200 of the corresponding selected transmission beams.

In a case of the beam acquisition procedure illustrated in FIG. 2, due to a narrow beam width, the number of reference signals or transmissions thereof is relatively large, thereby causing a high system overhead. Accordingly, exemplary embodiments of the present invention further proposes a beam acquisition procedure capable of decreasing the number of reference signals or the transmissions thereof and simultaneously obtaining a sufficient antenna gain.

Figure 3A:
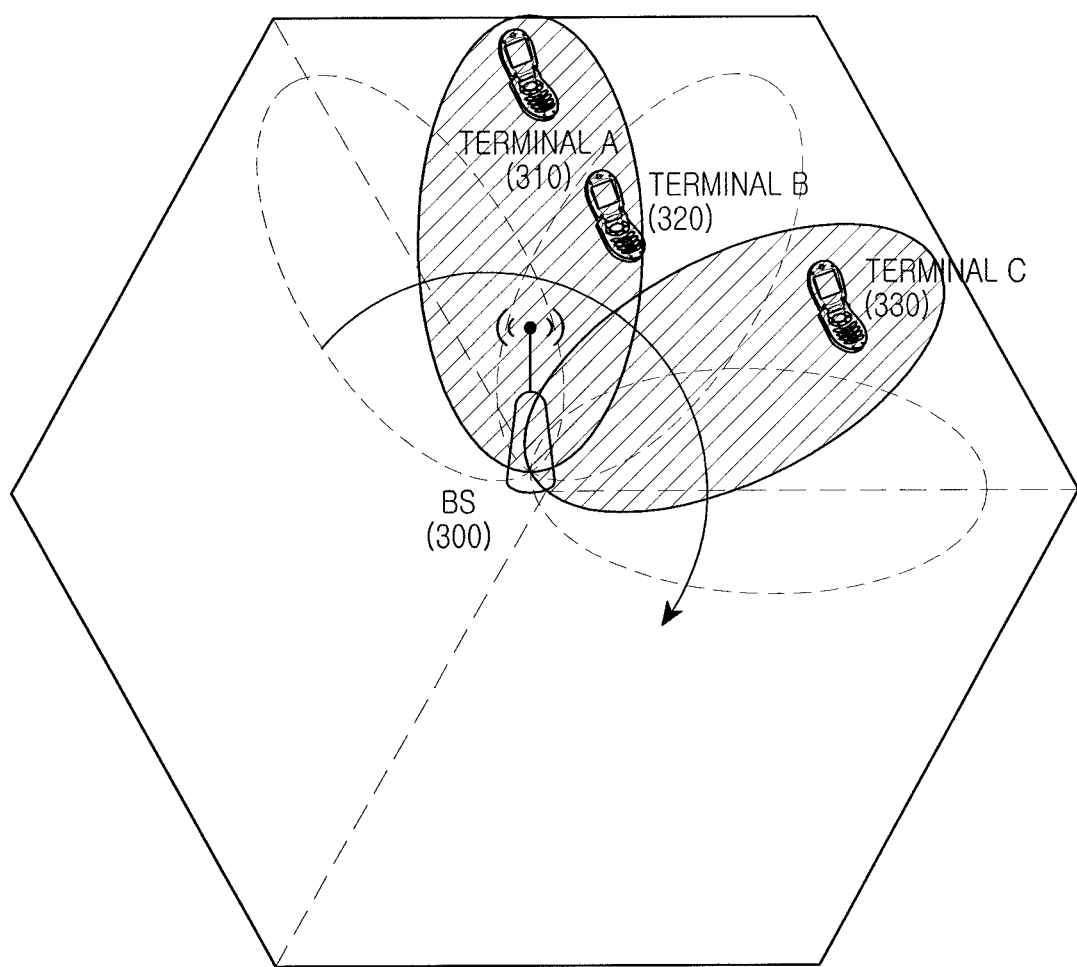
FIGS. 3A and 3B are diagrams schematically illustrating a beam acquisition procedure using all of a wide beam and a narrow beam in a wireless communication system according to an exemplary embodiment of the present invention.
Figure 3B:
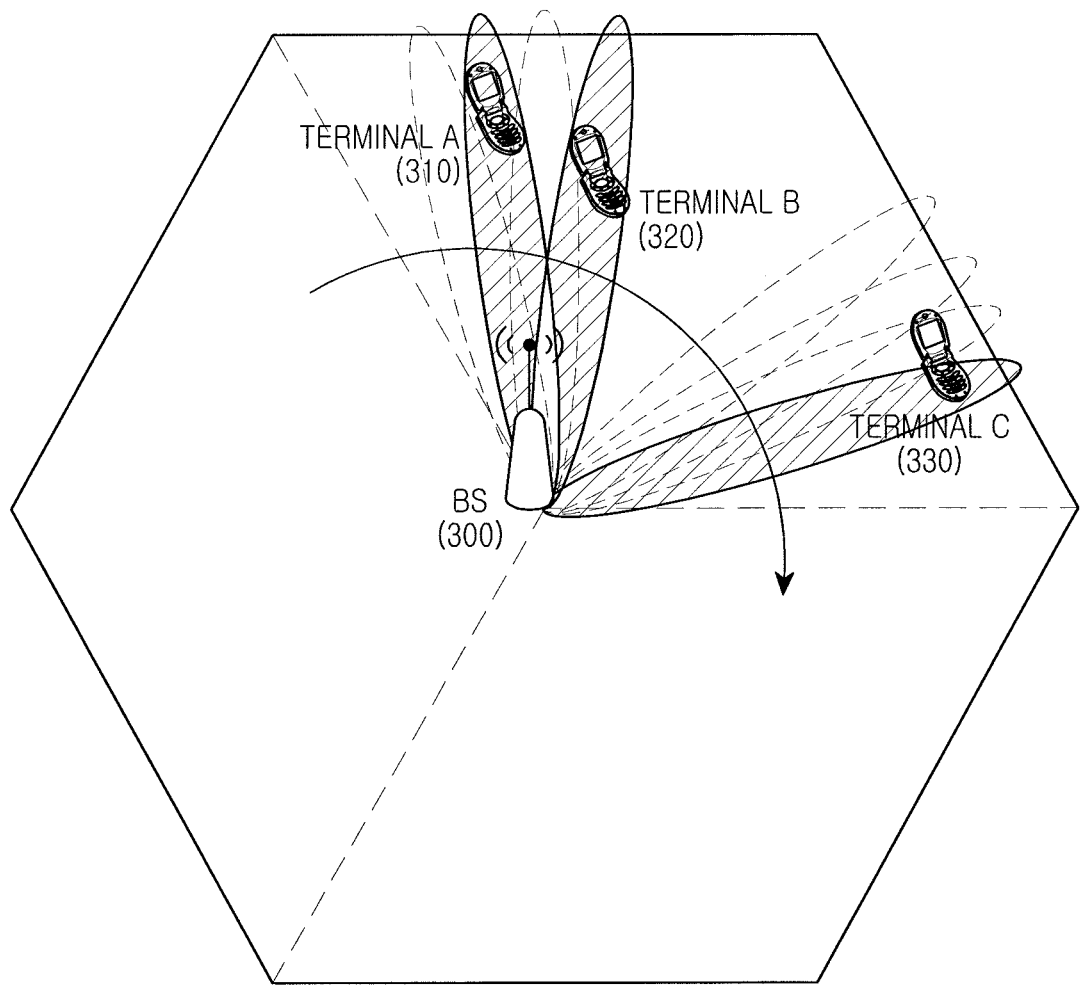

FIGS. 3A and 3B schematically illustrate a beam acquisition procedure using all of a wide beam and a narrow beam in a wireless communication system according to an exemplary embodiment of the present invention. The beam acquisition procedure using all of the wide beam and the narrow beam comprises two steps. FIG. 3A illustrates a 1st step of the beam acquisition procedure, and FIG. 3B illustrates a 2nd step of the beam acquisition procedure.

Referring to FIG. 3A, the 1st step of the beam acquisition procedure uses a beam having a wide beam width. For example, a BS 300 beamforms reference signals to wide beams, and repeatedly transmits the reference signals having wide beam widths in all directions within a sector through a resource of a constant time and frequency duration. In such an example, because the wide beams are used, the number of symbols necessary for repeated transmission of reference signals is decreased compared to the example illustrated in FIG. 2. According to this, terminals 310, 320, and 330 each measure reception signal strengths for reference signals and select wide beams having maximum reception signal strengths, as preferred-wide beams. At this time, the number of preferred-wide beams becomes different depending on a form of the distribution of the terminals located within one sector. For example, if all terminals are located intensively in the service coverage of one wide transmission beam, then only the one wide transmission beam is selected as a wide beam that the terminals all prefer. However, if terminals are uniformly distributed within one sector, then the whole wide transmission beams are selected as wide beams that the terminals each prefer. In FIG. 3A, the terminal A 310 and the terminal B 320 prefer a 2nd wide beam, and the terminal C 330 prefers a 4th wide beam. For example, among the whole five wide beams, only the two wide beams are selected as preferred-wide beams. According to this, the terminals 310, 320, and 330 each notify the BS 300 of their own preferred-wide beams. That is, the terminals 310, 320, and 330 each feed back information indicating the preferred-wide beams, to the BS 300.

Referring to FIG. 3B, the 2nd step of the beam acquisition procedure uses a beam having a narrow beam width. For example, the BS 300 beamforms reference signals to narrow beams, and repeatedly transmits the reference signals having narrow beam widths. At this time, the BS 300 determines a direction range to which the reference signals having the narrow beam widths are to be transmitted, considering the preferred-wide beam confirmed in the 1st step, and repeatedly transmits the reference signals having the narrow beam widths only within the determined range. For example, the BS 300 transmits the reference signals having the narrow beam widths only within a propagation range of at least one wide beam selected as a preferred-wide beam in the 1st step. It cannot be said that all terminals are always uniformly distributed within a sector. For example, the terminals can be distributed intensively in a partial area. Therefore, there is no need to transmit the reference signals having the narrow beam widths in all directions all the time. Through this, the BS 300 can exclude unnecessary transmission of reference signals. For example, when two wide beams that the terminals 310, 320, and 330 within the sector prefer are determined as in FIG. 3A, the BS 300 minutely turns a beam direction while sequentially transmitting the reference signals having the narrow beam widths to the terminals 310, 320, and 330 only within the propagation coverage of the two preferred-wide beams. Therefore, the terminals 310, 320, and 330 each measure reception signal strengths for the reference signals having the narrow beam widths, select narrow beams having maximum signal strengths as preferred-narrow beams, and notify the BS 300 of the preferred-narrow beams. As an example, the terminals 310, 320, and 330 each feed back information indicating the preferred-narrow beams, to the BS 300.

Through the procedures of FIG. 3A and FIG. 3B, each terminal can determine a preferred-narrow beam. For example, irrespective of the number of terminals, the number of preferred-wide beams is determined in a 1st step, and a preferred-narrow beam in the direction of the preferred-wide beam is determined in a 2nd step. Accordingly, if terminals are randomly distributed in the whole coverage within a sector, reference signals having narrow beam widths are transmitted only in a specific direction, such that the number of transmission of the reference signals is decreased. Because the 1st step uses wide beams, a burden of a system overhead is not large. Accordingly, in a case where a 2-step beam acquisition way of FIG. 3A and FIG. 3B is employed, a sufficient antenna gain can be obtained even with only a small overhead, depending on a position of a terminal within a sector.

A detailed exemplary embodiment of the present invention for determining the best beam according to the aforementioned scheme is described below. For description convenience below, exemplary embodiments of the present invention refers to the 'reference signal beamformed with wide beam' as a 'wide beam reference signal', and refers to the 'reference signal beamformed with narrow beam' as a 'narrow beam reference signal'.

In an exemplary embodiment of the present invention described below, it is assumed that a terminal is aware of system configuration information such as the number of wide beams used in a BS, the number of narrow beams corresponding to each wide beam, a position of a resource through which a wide beam is transmitted, a position of a resource through which a narrow beam is transmitted, and the like. For example, the system configuration information can be predefined and stored in the terminal at the time of terminal manufacturing, or can be provided to the terminal periodically during an initial entry process of the BS or through a Broadcast Channel (BCH). Also, in an exemplary embodiment of the present invention described below, even other information predefined between the BS and the terminal can be provided to the terminal as the system configuration information. Furthermore, in a case in which a BS according to an exemplary embodiment of the present invention can support all of exemplary embodiments described below and selectively carry out only one of the exemplary embodiments below, the BS can provide the terminal with indication information of notifying which exemplary embodiment the BS performs, as the system configuration information.

Figure 4:
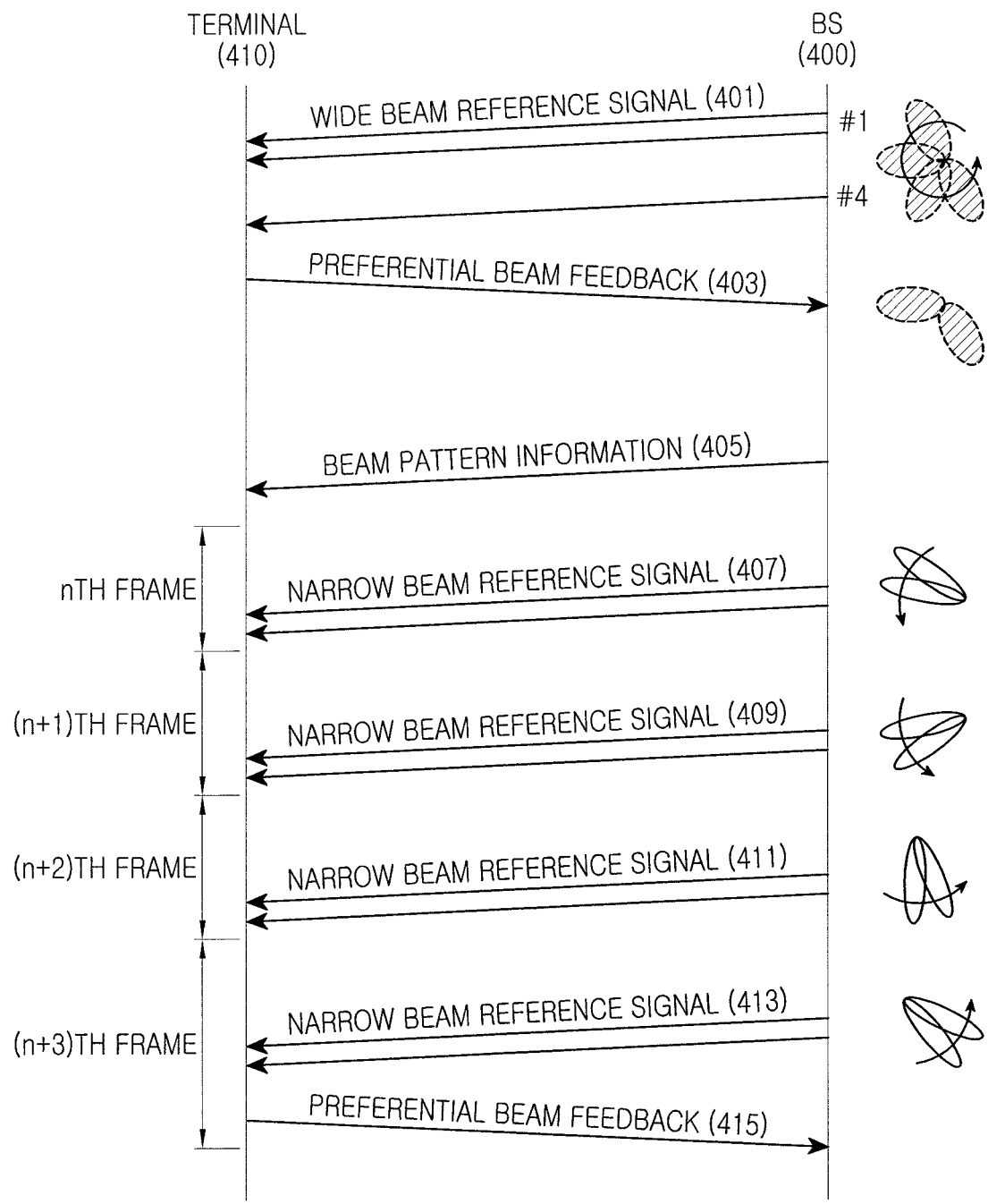
FIG. 4 is a diagram illustrating signaling for beam acquisition in a wireless communication system according to a first exemplary embodiment of the present invention.

FIG. 4 illustrates signaling for beam acquisition in a wireless communication system according to an exemplary embodiment of the present invention.

Referring to FIG. 4, in step 401, a BS 400 repeatedly transmits wide beam reference signals beamformed with wide beams, in all directions within a sector. The wide beam reference signals can be transmitted in a form of a synchronization channel, a preamble, a midamble and the like. As an example, exemplary embodiments of the present invention assume that all directions within one sector are supported by four wide beams. According to this, the BS 400 sequentially transmits four wide beam reference signals.

As the wide beam reference signals are transmitted in all the directions within the sector, in step 403, a terminal 410 determines a preferred-wide beam, and feeds back information indicating the preferred-wide beam, to the BS 400. In other words, the terminal 410 measures a reception signal strength for each of the wide beam reference signals and determines, as the preferred-wide beam, a wide beam corresponding to a reference signal having a maximum reception signal strength. As an example, the terminal 410 determines which of the wide beam reference signals transmitted by the BS 400 corresponds to the preferred-wide beam. According to exemplary embodiments of the present invention, the terminal 410 can determine two or more wide beams as preferred-wide beams. For example, exemplary embodiments of the present invention assume that two wide beams are determined as the preferred-wide beams.

After that, in step 405, the BS 400 receives information indicating preferred-wide beams from all terminals within a sector including the terminal 410 and then, transmits beam pattern information notifying transmission patterns of narrow beam reference signals to be transmitted hereafter, to the terminals. The beam pattern information can be constructed in an indexing scheme, a bitmap scheme, and the like. In a case of a 2-step beam acquisition procedure according to an exemplary embodiment of the present invention, measurement durations during which narrow beam reference signals are transmitted are continuous irrespective of the results of selection of preferred-wide beams. Accordingly, a position of a frame during which narrow beam reference signals corresponding to each preferred-wide beam are transmitted becomes different depending on the number of preferred-wide beams. However, the number and direction of the whole preferred-wide beams are known to only the BS 400, such that the terminal 410 cannot be aware of the number and direction of preferred-wide beams other than its own preferred-wide beam and accordingly, cannot be aware of the transmission patterns of the narrow beam reference signals. Therefore, the BS 400 provides information notifying the transmission patterns of the narrow beam reference signals to be transmitted hereafter, to the terminals.

For example, if the terminal 410 can know whether narrow beam reference signals corresponding to a preferred-narrow beam are transmitted through any frames, in other words, if the terminal 410 can know a corresponding relationship between a preferred-wide beam and a frame, then the terminal 410 can detect the narrow beam reference signal only in frames corresponding to its own preferred-wide beam. Accordingly, the beam pattern information can include information notifying the corresponding relationship between the preferred-wide beam and the frame. Here, when a narrow beam reference signal is transmitted according to the order of an index of a wide beam, the corresponding relationship between the preferred-wide beam and the frame can be expressed by an index of at least one preferred-wide beam confirmed in the BS 400. Or, the corresponding relationship between the preferred-wide beam and the frame can be expressed by a combination of an index of each preferred-wide beam and an index of a corresponding frame.

As another example, if the terminal 410 can know the number of narrow beam reference signals to be transmitted hereafter, the terminal 410 can detect all the narrow beam reference signals. Accordingly, the beam pattern information can include information notifying the number of narrow beam reference signals to be transmitted. Here, the number of narrow beam reference signals to be transmitted can be indirect expressed through the number of frames in which the narrow beam reference signals are to be transmitted, the number of preferred-wide beams, an index of the last one of frames in which the narrow beam reference signals are to be transmitted and the like.

For example, the beam pattern information can include at least one of an index of a preferred-wide beam, a combination of an index of a preferred-wide beam and an index of a corresponding frame, the number of narrow beam reference signals to be transmitted, the number of frames in which the narrow beam reference signals are to be transmitted, the number of preferred-wide beams, and an index of the last one of frames in which the narrow beam reference signals are to be transmitted.

Next, in step 407 to step 413, the BS 400 determines a direction range over which it is to transmit narrow beam reference signals depending on at least one preferred-wide beam and then, repeatedly transmits the narrow beam reference signals within the determined range. The narrow beam reference signal can be transmitted in a form of a pilot symbol. In detail, the BS 400 determines a propagation range of the at least one preferred-wide beam as the direction range over which it is to transmit the narrow beam reference signals. And, the BS 400 minutely turns a beam direction within the determined range while sequentially transmitting the narrow beam reference signals. Here, exemplary embodiments of the present invention assume that one wide beam reference signal corresponds to four narrow beam reference signals, and that two narrow beam reference signals per frame are transmitted. In this case, as illustrated in FIG. 4, when two preferred-wide beams are selected, the BS 400 transmits the total eight narrow beam reference signals through four frames (e.g., as illustrated at steps 407, 409, 411, and 413). According to another exemplary embodiment of the present invention, the frame of FIG. 4 can be substituted with a super frame. The super frame means a bundle of multiple frames.

As the narrow beam reference signals are transmitted within the propagation ranges of the preferred-wide beams, in step 415, the terminal 410 determines a preferred-narrow beam, and feeds back information indicating the preferred-narrow beam, to the BS 400. In other words, the terminal 410 measures a reception signal strength for each of the narrow beam reference signals and determines, as the preferred-narrow beam, a narrow beam corresponding to a reference signal having a maximum reception signal strength. At this time, the terminal 410 can grasp transmission patterns of the narrow beam reference signals through the beam pattern information, and detect the narrow beam reference signals according to the transmission patterns. Particularly, when the beam pattern information transmitted in step 405 includes information notifying a corresponding relationship between a preferred-wide beam and a frame, the terminal 410 can detect the narrow beam reference signals only in frames corresponding to its own preferred-wide beam.

In FIG. 4, the terminal 410 receives the last narrow beam reference signal in an (n+3)th frame, and feeds back information indicating a preferred-narrow beam to the BS 400 in the (n+3)th frame. But, a time point of feedback of the information indicating the preferred-narrow beam illustrated in FIG. 4 is one example and, according to another exemplary embodiment of the present invention, the terminal 410 can feed back the information indicating the preferred-narrow beam after the (n+3)th frame.

Figure 5:
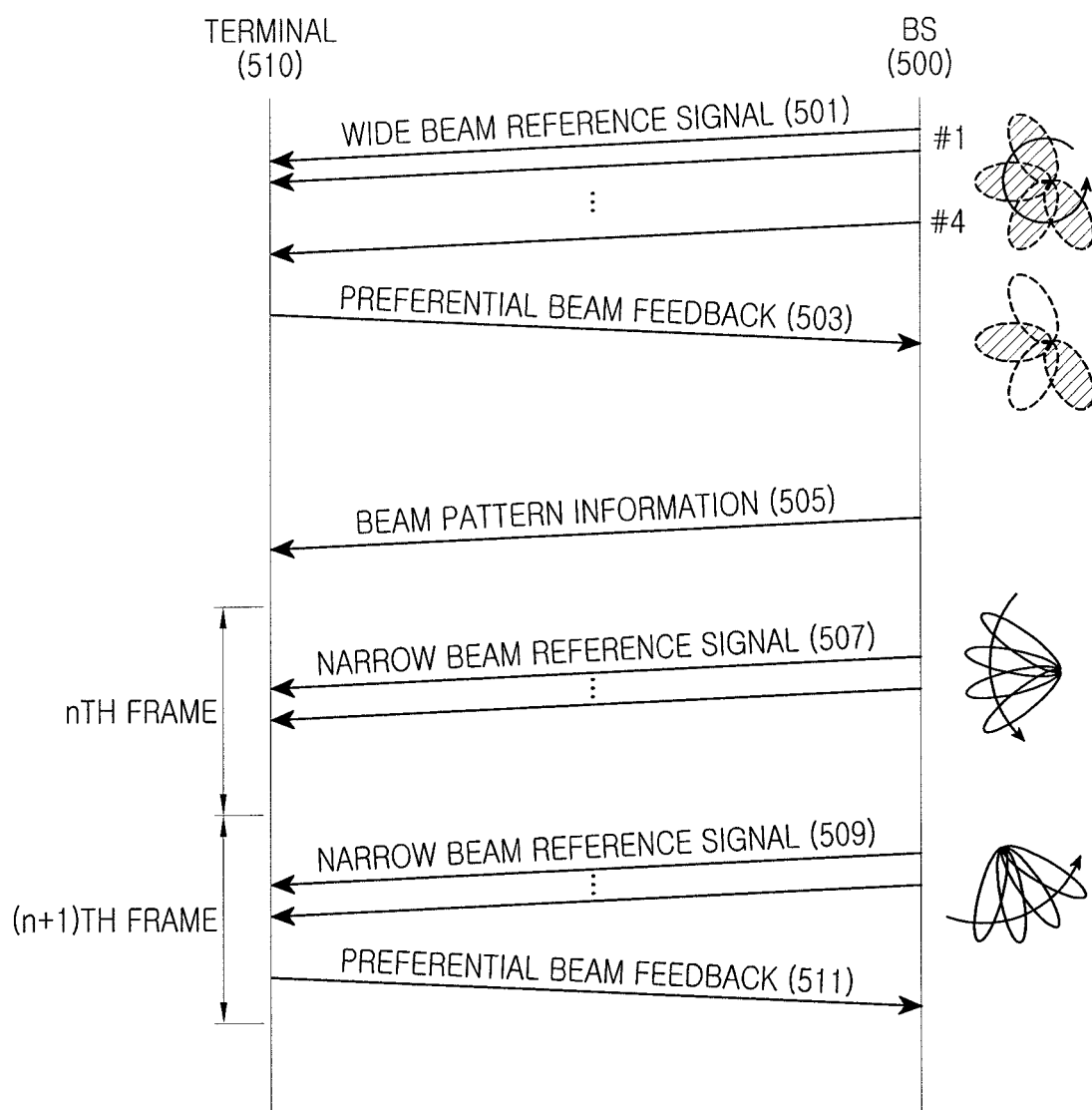
FIG. 5 is a diagram illustrating signaling for beam acquisition in a wireless communication system according to a second exemplary embodiment of the present invention.

FIG. 5 illustrates signaling for beam acquisition in a wireless communication system according to a second exemplary embodiment of the present invention.

Referring to FIG. 5, in step 501, a BS 500 repeatedly transmits wide beam reference signals beamformed with wide beams, in all directions within a sector. The wide beam reference signals can be transmitted in a form of a synchronization channel, a preamble, a midamble, and the like. Here, the exemplary embodiment of the present invention assumes that all directions within one sector are supported by four wide beams. According to this, the BS 500 sequentially transmits four wide beam reference signals.

As the wide beam reference signals are transmitted in all the directions within the sector, in step 503, a terminal 510 determines a preferred-wide beam, and feeds back information indicating the preferred-wide beam, to the BS 500. In other words, the terminal 510 measures a reception signal strength for each of the wide beam reference signals and determines, as the preferred-wide beam, a wide beam corresponding to a reference signal having a maximum reception signal strength. As an example, the terminal 510 determines which of the wide beam reference signals transmitted by the BS 500 corresponds to the preferred-wide beam. According to exemplary embodiments of the present invention, the terminal 510 can determine two or more wide beams as preferred-wide beams. An exemplary embodiment of the present invention assumes that two wide beams are determined as the preferred-wide beams.

After that, in step 505, the BS 500 receives information indicating preferred-wide beams from all terminals within a sector including the terminal 510 and then, transmits beam pattern information notifying transmission patterns of narrow beam reference signals to be transmitted hereafter, to the terminals. The beam pattern information can be constructed in an indexing scheme, a bitmap scheme, and the like. In a case of a 2-step beam acquisition procedure according to an exemplary embodiment of the present invention, measurement durations during which narrow beam reference signals are transmitted are continuous irrespective of the results of selection of preferred-wide beams. Accordingly, a position of a frame during which narrow beam reference signals corresponding to each preferred-wide beam are transmitted becomes different depending on the number of preferred-wide beams. However, the number and direction of the whole preferred-wide beams are known to only the BS 500, such that the terminal 510 cannot be aware of the number and direction of preferred-wide beams other than its own preferred-wide beam and accordingly, cannot be aware of the transmission patterns of the narrow beam reference signals. Therefore, the BS 500 provides information notifying the transmission patterns of the narrow beam reference signals to be transmitted hereafter, to the terminals.

For example, if the terminal 510 can know whether narrow beam reference signals corresponding to a preferred-narrow beam are transmitted through any frame, in other words, if the terminal 510 can know a corresponding relationship between a preferred-wide beam and a frame, the terminal 510 can detect the narrow beam reference signals only in a frame corresponding to its own preferred-wide beam. Accordingly, the beam pattern information can include information notifying the corresponding relationship between the preferred-wide beam and the frame. Here, when a narrow beam reference signal is transmitted according to the order of an index of a wide beam, the corresponding relationship between the preferred-wide beam and the frame can be expressed by an index of at least one preferred-wide beam confirmed in the BS 500. Or, the corresponding relationship between the preferred-wide beam and the frame can be expressed by a combination of an index of each preferred-wide beam and an index of a corresponding frame.

As another example, if the terminal 510 can know the number of narrow beam reference signals to be transmitted hereafter, the terminal 510 can detect all the narrow beam reference signals. Accordingly, the beam pattern information can include information notifying the number of narrow beam reference signals to be transmitted. Here, the number of narrow beam reference signals to be transmitted can be indirect expressed through the number of frames in which the narrow beam reference signals are to be transmitted, the number of preferred-wide beams, an index of the last one of frames in which the narrow beam reference signals are to be transmitted and the like.

For example, the beam pattern information can include at least one of an index of a preferred-wide beam, a combination of an index of a preferred-wide beam and an index of a corresponding frame, the number of narrow beam reference signals to be transmitted, the number of frames in which the narrow beam reference signals are to be transmitted, the number of preferred-wide beams, and an index of the last one of frames in which the narrow beam reference signals are to be transmitted.

Next, in step 507 and step 509, the BS 500 determines a direction range over which it is to transmit narrow beam reference signals depending on at least one preferred-wide beam and then, repeatedly transmits the narrow beam reference signals within the determined range. The narrow beam reference signal can be transmitted in a form of a pilot symbol. In detail, the BS 500 determines a propagation range of the at least one preferred-wide beam as the direction range over which it is to transmit the narrow beam reference signals. And, the BS 500 minutely turns a beam direction within the determined range while sequentially transmitting the narrow beam reference signals. Here, exemplary embodiments of the present invention assume that one wide beam reference signal corresponds to four narrow beam reference signals, and four narrow beam reference signals per frame are transmitted. In this case, as illustrated in FIG. 5, when two preferred-wide beams are selected, the BS 500 transmits the total eight narrow beam reference signals through two frames (e.g., as illustrated at steps 507 and 509). According to another exemplary embodiment of the present invention, the frame of FIG. 5 can be substituted with a super frame. The super frame means a bundle of multiple frames.

As the narrow beam reference signals are transmitted within the propagation ranges of the preferred-wide beams, in step 511, the terminal 510 determines a preferred-narrow beam, and feeds back information indicating the preferred-narrow beam, to the BS 500. In other words, the terminal 510 measures a reception signal strength for each of the narrow beam reference signals and determines, as the preferred-narrow beam, a narrow beam corresponding to a reference signal having a maximum reception signal strength. At this time, the terminal 510 can grasp transmission patterns of the narrow beam reference signals through the beam pattern information, and detect the narrow beam reference signals according to the transmission patterns. Particularly, when the beam pattern information transmitted in step 505 includes information notifying a corresponding relationship between a preferred-wide beam and a frame, the terminal 510 can detect the narrow beam reference signals only in a frame corresponding to its own preferred-wide beam.

In FIG. 5, the terminal 510 receives the last narrow beam reference signal in an (n+1)th frame, and feeds back information indicating a preferred-narrow beam to the BS 500 in the (n+1)th frame. But, a time point of feedback of the information indicating the preferred-narrow beam illustrated in FIG. 5 is one example and, according to another exemplary embodiment of the present invention, the terminal 510 can feed back the information indicating the preferred-narrow beam after the (n+1)th frame.

The comparison of the exemplary embodiment of the present invention illustrated in FIG. 4 and the exemplary embodiment of the present invention illustrated in FIG. 5 is given as follows. The exemplary embodiment of the present invention illustrated in FIG. 4 transmits two narrow beam reference signals per frame, and the exemplary embodiment of the present invention illustrated in FIG. 5 transmits four narrow beam reference signals per frame. According to this, in the exemplary embodiment of the present invention illustrated in FIG. 4, an overhead caused by reference signals per frame is relatively less. However, in the exemplary embodiment of the present invention illustrated in FIG. 4, a time required for completing transmission of narrow beam reference signals is relatively long. Accordingly, the exemplary embodiment of the present invention illustrated in FIG. 4 is advantageous to a service not sensitive to a time delay, and the exemplary embodiment of the present invention illustrated in FIG. 5 is advantageous to a service guaranteeing a short time delay.

Figure 6:
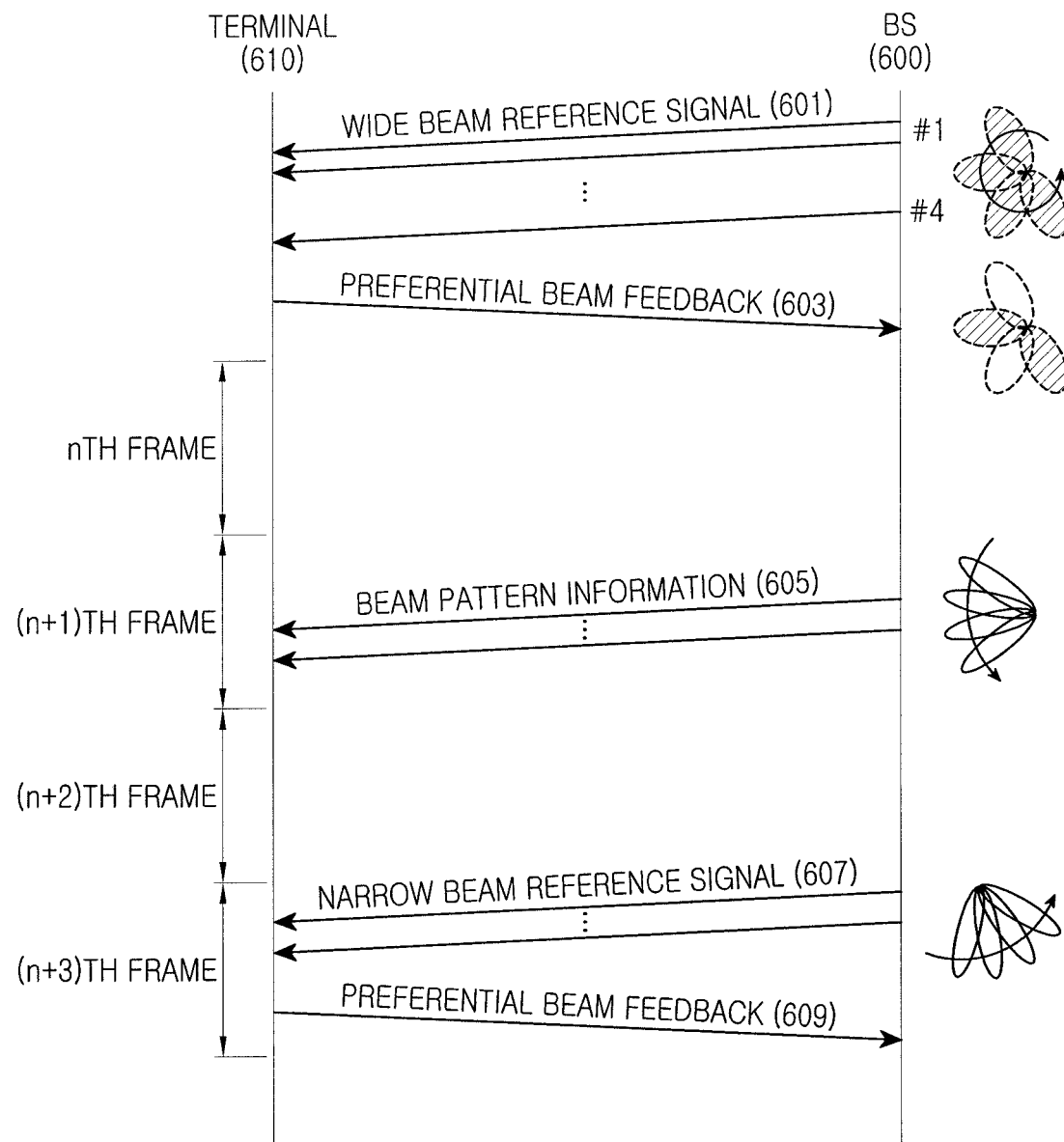
FIG. 6 is a diagram illustrating signaling for beam acquisition in a wireless communication system according to a third exemplary embodiment of the present invention.

FIG. 6 illustrates signaling for beam acquisition in a wireless communication system according to a third exemplary embodiment of the present invention.

Referring to FIG. 6, in step 601, a BS 600 repeatedly transmits wide beam reference signals beamformed with wide beams, in all directions within a sector. The wide beam reference signals can be transmitted in a form of a synchronization channel, a preamble, a midamble, and the like. Here, the exemplary embodiment of the present invention assumes that all directions within one sector are supported by four wide beams. According to this, the BS 600 sequentially transmits four wide beam reference signals.

As the wide beam reference signals are transmitted in all the directions within the sector, in step 603, a terminal 610 determines a preferred-wide beam, and feeds back information indicating the preferred-wide beam, to the BS 600. In other words, the terminal 610 measures a reception signal strength for each of the wide beam reference signals and determines, as the preferred-wide beam, a wide beam corresponding to a reference signal having a maximum reception signal strength. As an example, the terminal 610 determines which of the wide beam reference signals transmitted by the BS 600 corresponds to the preferred-wide beam. According to exemplary embodiments of the present invention, the terminal 610 can determine two or more wide beams as preferred-wide beams. An exemplary embodiment of the present invention assumes that two wide beams are determined as the preferred-wide beams.

In the exemplary embodiment of the present invention illustrated in FIG. 6, narrow beam reference signals are transmitted in a frame or super frame of a predefined position depending on a corresponding wide beam reference signal. For example, in a case in which narrow beam reference signals are transmitted during four frames after completion of feedback of preferred-wide beams, narrow beam reference signals to be transmitted in the direction of a 1st wide beam are transmitted during a 1st frame, narrow beam reference signals to be transmitted in the direction of a 2nd wide beam are transmitted during a 2nd frame, narrow beam reference signals to be transmitted in the direction of a 3rd wide beam are transmitted during a 3rd frame, and narrow beam reference signals to be transmitted in the direction of a 4th wide beam are transmitted during a 4th frame. Accordingly, when partial wide beams are not selected as preferred-wide beams, partial frames corresponding to the non-selected wide beams do not carry narrow beam reference signals. Accordingly, although terminals are not aware of the number of narrow beam reference signals transmitted hereafter, the terminals can determine that the narrow beam reference signals are transmitted in the direction of their own preferred-wide beams during frames corresponding to their own preferred-wide beams. Therefore, in contrast to the exemplary embodiments of the present invention illustrated in FIG. 4 and FIG. 5, in the exemplary embodiment illustrated in FIG. 6, the BS 600 does not transmit beam pattern information. In this case, information about a position of a frame during which narrow beams corresponding to each wide beam are transmitted can be periodically transmitted as system configuration information during an initial entry process of the terminal 610 or through a BCH. However, according to another exemplary embodiment of the present invention, the BS 600 can transmit beam pattern information, which represents a corresponding relationship between a wide beam and a frame, to a terminal to guarantee the certainty of a narrow beam reception operation of the terminal.

Next, in step 605 and step 607, the BS 600 determines a direction range that is to transmit narrow beam reference signals and a frame depending on at least one preferred-wide beam and then, repeatedly transmits the narrow beam reference signals within the determined range through the determined at least one frame. The narrow beam reference signal can be transmitted in a form of a pilot symbol. In detail, the BS 600 determines a propagation range of the at least one preferred-wide beam as the direction range that is to transmit the narrow beam reference signals. And, the BS 600 minutely turns a beam direction within the determined range while sequentially transmitting the narrow beam width reference signals through the determined at least one frame. Here, an exemplary embodiment of the present invention assumes that one wide beam reference signal corresponds to four narrow beam reference signals, and four narrow beam reference signals per frame are transmitted. In this case, as illustrated in FIG. 6, when a 2nd wide beam and a 4th wide beam are selected as preferred-wide beams, the BS 600 transmits four narrow beam reference signals within a propagation range of the 2nd wide beam through an (n+1)th frame, and four narrow beam reference signals within a propagation range of the 4th wide beam through an (n+3)th frame. According to another exemplary embodiment of the present invention, the frame of FIG. 6 can be substituted with a super frame. The super frame means a bundle of multiple frames.

As the narrow beam reference signals are transmitted within the propagation ranges of the preferred-wide beams, in step 609, the terminal 610 determines a preferred-narrow beam, and feeds back information indicating the preferred-narrow beam to the BS 600. In other words, the terminal 610 measures a reception signal strength for each of the narrow beam reference signals transmitted through the frame corresponding to its own preferred-wide beam and determines, as its own preferred-narrow beam, a narrow beam corresponding to a reference signal having a maximum reception signal strength.

In FIG. 6, the terminal 610 receives the last narrow beam reference signal in the (n+3)th frame, and feeds back information indicating the preferred-narrow beam to the BS 600 in the (n+3)th frame. But, a time point of feedback of the information indicating the preferred-narrow beam illustrated in FIG. 6 is one example and, according to another exemplary embodiment of the present invention, the terminal 610 can feed back the information indicating the preferred-narrow beam after the (n+3)th frame.

In the exemplary embodiments of the present invention described with reference to FIG. 4 to FIG. 6, a BS minimizes transmission ranges of narrow beam reference signals using a wide beam reference signal. However, when terminals are uniformly distributed within a cell or sector, the BS transmits narrow beam reference signals in all directions despite transmission of the wide beam reference signal. In this case, the process of transmitting the wide beam reference signal is not greatly meaningful. For example, when the terminals are uniformly distributed within the cell or sector, the wide beam reference signal undesirably rather increases a system overhead and a time delay.

Accordingly, according to another exemplary embodiment of the present invention, before the execution of a beam acquisition procedure, a BS can determine transmission or non-transmission of wide beam reference signal considering the distribution of terminals within a cell or sector. If it is determined that the terminals are uniformly distributed within the cell or sector, the BS omits the transmission of the wide beam reference signal, and transmits narrow beam reference signals in all directions within the cell or sector. In contrast, if it is determined that the terminals are randomly distributed within the cell or sector, as illustrated in FIG. 4 to FIG. 6, the BS determines a direction range that is to transmit narrow beam reference signals using a wide beam reference signal and then, transmits the narrow beam reference signals.

For example, as a way of checking the distribution of terminals, a location based system can be considered. The location based system can measure a location of a terminal using Global Positioning System (GPS) signals or transmission signals of neighboring BSs. Or, as a way of checking the distribution of terminals, a BS can use a beam acquisition procedure according to an exemplary embodiment of the present invention without an additional procedure of checking the distribution of the terminals. That is, the beam acquisition procedure according to the exemplary embodiment of the present invention can be repeatedly executed periodically or randomly in a system operation process. Accordingly, the BS can determine if the distribution of the terminals is uniform using the measurement result of a previously executed beam acquisition procedure.

Operations and constructions of a BS and a terminal performing a beam acquisition procedure as above are described below in detail with reference to the accompanying drawings.

Figure 7:
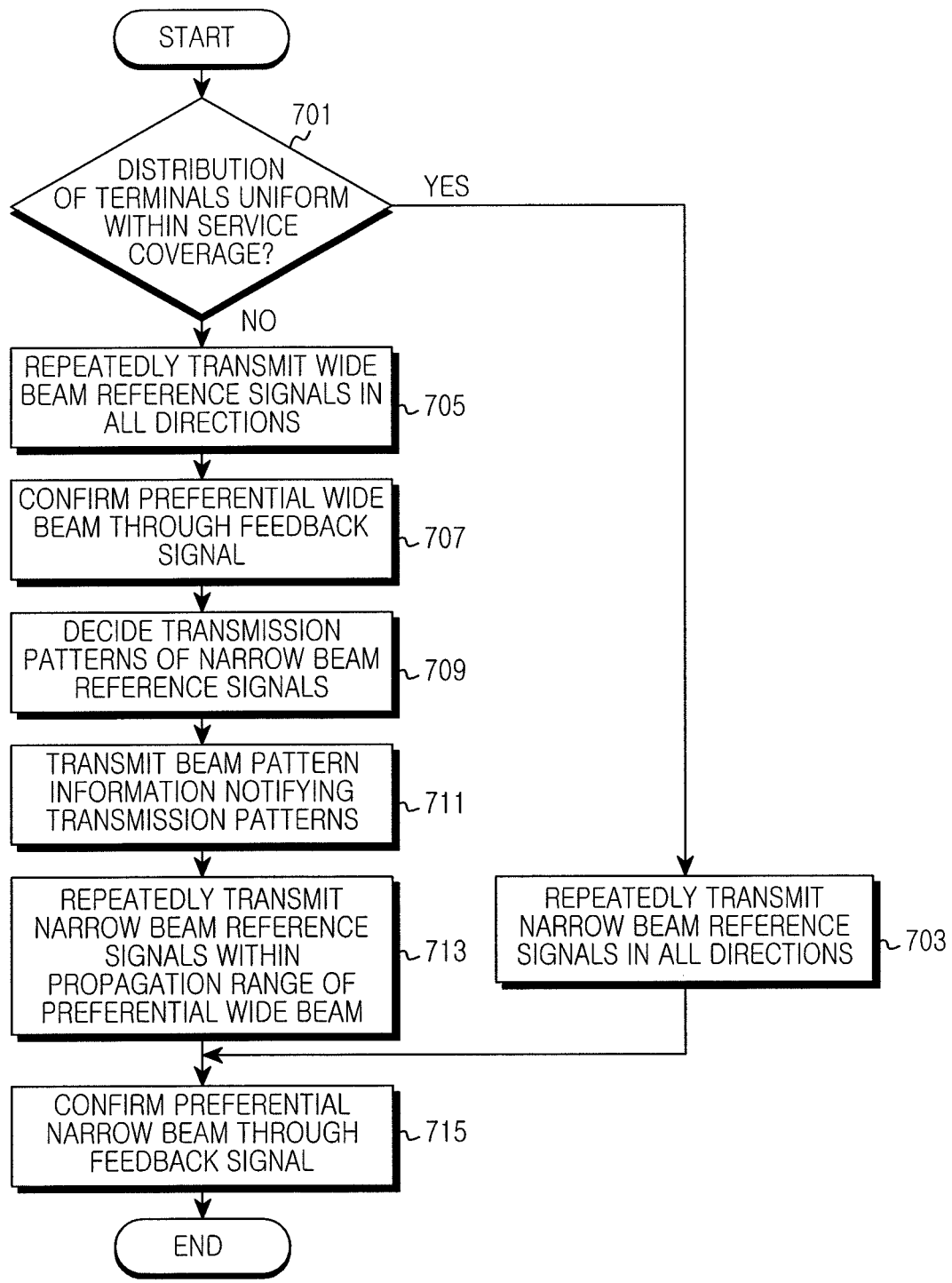
FIG. 7 is a flowchart illustrating an operation procedure of a Base Station (BS) for selection of the best beam in a wireless communication system according to an exemplary embodiment of the present invention.

FIG. 7 illustrates an operation procedure of a BS for selection of the best beam in a wireless communication system according to an exemplary embodiment of the present invention.

Referring to FIG. 7, in step 701, the BS determines if terminals are uniformly distributed within its service coverage. Here, the service coverage means a cell or sector. For example, whether the terminals are uniformly distributed within the service coverage can be determined based on location information of each terminal measured using GPS signals or signals of neighboring BSs. As another example, whether the terminals are uniformly distributed within the service coverage can be determined based on measurement information of a previously executed beam acquisition procedure according to an exemplary embodiment of the present invention.

If it is determined in step 701 that the terminals are uniformly distributed within the service coverage, the BS proceeds to step 703 and repeatedly transmits narrow beam reference signals in all directions within the service coverage. For example, the BS sequentially transmits reference signals beamformed with narrow beams of different directions, without performing the step of transmitting wide beam reference signals.

In contrast, if it is determined in step 701 that the terminals are randomly distributed within the service coverage, in other words, when the terminals are concentrated on a specific coverage or do not exist in the specific coverage, the BS proceeds to step 705 and repeatedly transmits wide beam reference signals in all directions within the service coverage. For example, the BS sequentially transmits reference signals beamformed with wide beams of different directions. Here, the wide beam reference signal can be transmitted in a form of a synchronization channel, a preamble, a midamble, and the like.

After transmitting the wide beam reference signals, the BS proceeds to step 707 and confirms a preferred-wide beam of at least one terminal through a feedback signal received from the at least one terminal According to exemplary embodiments of the present invention, the feedback signal includes information indicating the preferred-wide beam of the terminal having transmitted the feedback signal. The information indicating the preferred-wide beam of the terminal can include an index of a reference signal or an index of a beam.

After confirming the preferred-wide beam of the at least one terminal, the BS proceeds to step 709 and determines transmission patterns of narrow beam reference signals to be transmitted hereafter. The transmission pattern is an issue on whether to transmit any narrow beam reference signals, or whether to transmit narrow beam reference signals corresponding to any wide beam through any measurement duration. Here, the measurement duration is indicated by a frame or super frame. In other words, the BS determines whether to transmit any narrow beam reference signals depending on the preferred-wide beam of the at least one terminal, or whether to transmit narrow beam reference signals corresponding to any wide beam through any measurement duration. For example, as illustrated in FIG. 4 and FIG. 5, in a case in which measurement durations during which narrow beam reference signals are transmitted are continuous irrespective of the results of selection of preferred-wide beams, the BS determines the number of measurement durations that are to transmit the narrow beam reference signals, depending on the number of preferred-wide beams of at least one terminal. And, the BS allocates the continuous measurement durations to the preferred-wide beams, and determines to transmit the narrow beam reference signals through the measurement duration allocated to the corresponding preferred-wide beam. As another example, as illustrated in FIG. 6, in a case in which the distribution of measurement durations during which narrow beam reference signals are transmitted becomes different depending on the results of selection of preferred-wide beams, the BS confirms a position of at least one measurement duration corresponding to a preferred-wide beam of at least one terminal according to a predefined corresponding relationship therebetween, and determines to transmit the narrow beam reference signals through the measurement duration corresponding to the corresponding preferred-wide beam.

After determining the transmission patterns of the narrow beam reference signals, the BS proceeds to step 711 and transmits beam pattern information notifying the transmission patterns of the narrow beam reference signals. For example, the beam pattern information can include at least one of an index of a preferred-wide beam, a combination of an index of a preferred-wide beam and an index of a corresponding measurement duration, the number of narrow beam reference signals to be transmitted, the number of measurement durations during which narrow beam reference signals are to be transmitted, the number of preferred-wide beams, and an index of the last one of measurement durations during which narrow beam reference signals are to be transmitted. However, when a corresponding relationship between a preferred-wide beam and a measurement duration is predefined, step 711 can be omitted. For example, in a case of the exemplary embodiment of the present invention illustrated in FIG. 6, step 711 can be omitted.

Next, the BS proceeds to step 713 and repeatedly transmits narrow beam reference signals within a propagation range of the preferred-wide beam. At this time, the BS transmits the narrow beam reference signals according to the transmission patterns. For example, as illustrated in FIG. 4 and FIG. 5, the BS transmits narrow beam reference signals through continuous measurement durations. For another example, as illustrated in FIG. 6, the BS transmits narrow beam reference signals through measurement durations of a position corresponding to the preferred-wide beam.

After repeatedly transmitting the narrow beam reference signals in step 703 or step 713, the BS proceeds to step 715 and confirms a preferred-narrow beam of at least one terminal through a feedback signal received from the at least one terminal. The feedback signal includes information indicating the preferred-narrow beam of the at least one terminal having transmitted the feedback signal. The information indicating the preferred-narrow beam can include an index of a reference signal or an index of a beam.

The method described above in relation with FIG. 7 under of the present invention may be provided as one or more instructions in one or more software modules, or computer programs stored in an electronic device including the BS.

Figure 8:
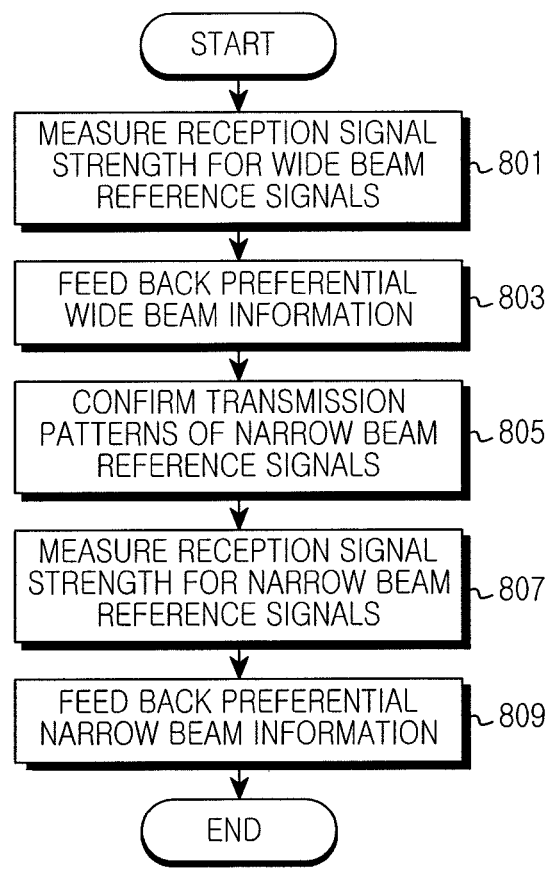
FIG. 8 is a flowchart illustrating an operation procedure of a terminal for selection of the best beam in a wireless communication system according to an exemplary embodiment of the present invention.

FIG. 8 illustrates an operation procedure of a terminal for selection of the best beam in a wireless communication system according to an exemplary embodiment of the present invention.

Referring to FIG. 8, in step 801, the terminal measures a reception signal strength for wide beam reference signals received from a BS. The wide beam reference signals are repeatedly transmitted in all directions within the service coverage of the BS. The wide beam reference signals can be transmitted in a form of a synchronization channel, a preamble, and a midamble and the like.

After measuring the reception signal strength for the wide beam reference signals, the terminal proceeds to step 803 and transmits a feedback signal notifying a preferred-wide beam of the terminal, to the BS. The feedback signal includes information indicating the preferred-wide beam of the terminal. The information indicating the preferred-wide beam of the terminal can include an index of a reference signal or an index of a beam. At this time, the terminal can determine two or more wide beams as preferred-wide beams.

Next, the terminal proceeds to step 805 and confirms transmission patterns of narrow beam reference signals to be received hereafter. According to an exemplary embodiment of the present invention, the terminal can determine the transmission patterns depending on beam pattern information provided from the BS. For example, the beam pattern information can include at least one of an index of a preferred-wide beam, a combination of an index of a preferred-wide beam and an index of a corresponding measurement duration, the number of reference signals beamformed with a 2nd width to be transmitted, the number of measurement durations during which reference signals beamformed with a 2nd width are to be transmitted, the number of preferred-wide beams, and an index of the last one of measurement durations during which reference signals beamformed with a 2nd width are to be transmitted. In detail, the terminal receives the beam pattern information notifying the transmission patterns from the BS, and determines the number of narrow beam reference signals to be received, through the beam pattern information. And, the terminal confirms a measurement duration allocated to its preferred-wide beam through the beam pattern information. Here, the measurement duration allocated to the preferred-wide beam is determined according to the order of an index of the preferred-wide beam that the terminal prefers among the whole preferred-wide beams.

According to another exemplary embodiment of the present invention, the terminal confirms a measurement duration corresponding to a preferred-wide beam according to a predefined corresponding relationship therebetween. In detail, the terminal is aware of the predefined corresponding relationship between the preferred-wide beam and the measurement duration irrespective of the number and direction of preferred-wide beams and, according to this, the terminal can determine a corresponding measurement duration according to the order of an index of a preferred-wide beam that the terminal prefers.

After confirming the transmission patterns of the narrow beam reference signals, the terminal proceeds to step 807 and measures a reception signal strength for narrow beam reference signals received from the BS. At this time, when confirming a measurement duration allocated to a preferred-wide beam using the beam pattern information, the terminal can detect narrow beam reference signals only during the measurement duration and measure a reception signal strength for the narrow beam reference signals. Also, when confirming a measurement duration allocated to a preferred-wide beam according to a predefined corresponding relationship therebetween, the terminal can detect narrow beam reference signals only during the measurement duration and measure the reception signal strength for the narrow beam reference signals. Also, when confirming only the number of narrow beam reference signals through the beam pattern information, the terminal can detect all the narrow beam reference signals during a measurement duration corresponding to the number of narrow beam reference signals and measure a reception signal strength for the narrow beam reference signals.

After measuring the reception signal strength for the narrow beam reference signals, the terminal proceeds to step 809 and transmits a feedback signal notifying the preferred-narrow beam to the BS. The feedback signal includes information indicating the preferred-narrow beam of the terminal. The information indicating the preferred-narrow beam of the terminal can include an index of a reference signal or an index of a beam.

The method described above in relation with FIG. 9 under of the present invention may be provided as one or more instructions in one or more software modules, or computer programs stored in an electronic device including the terminal.

Figure 9:
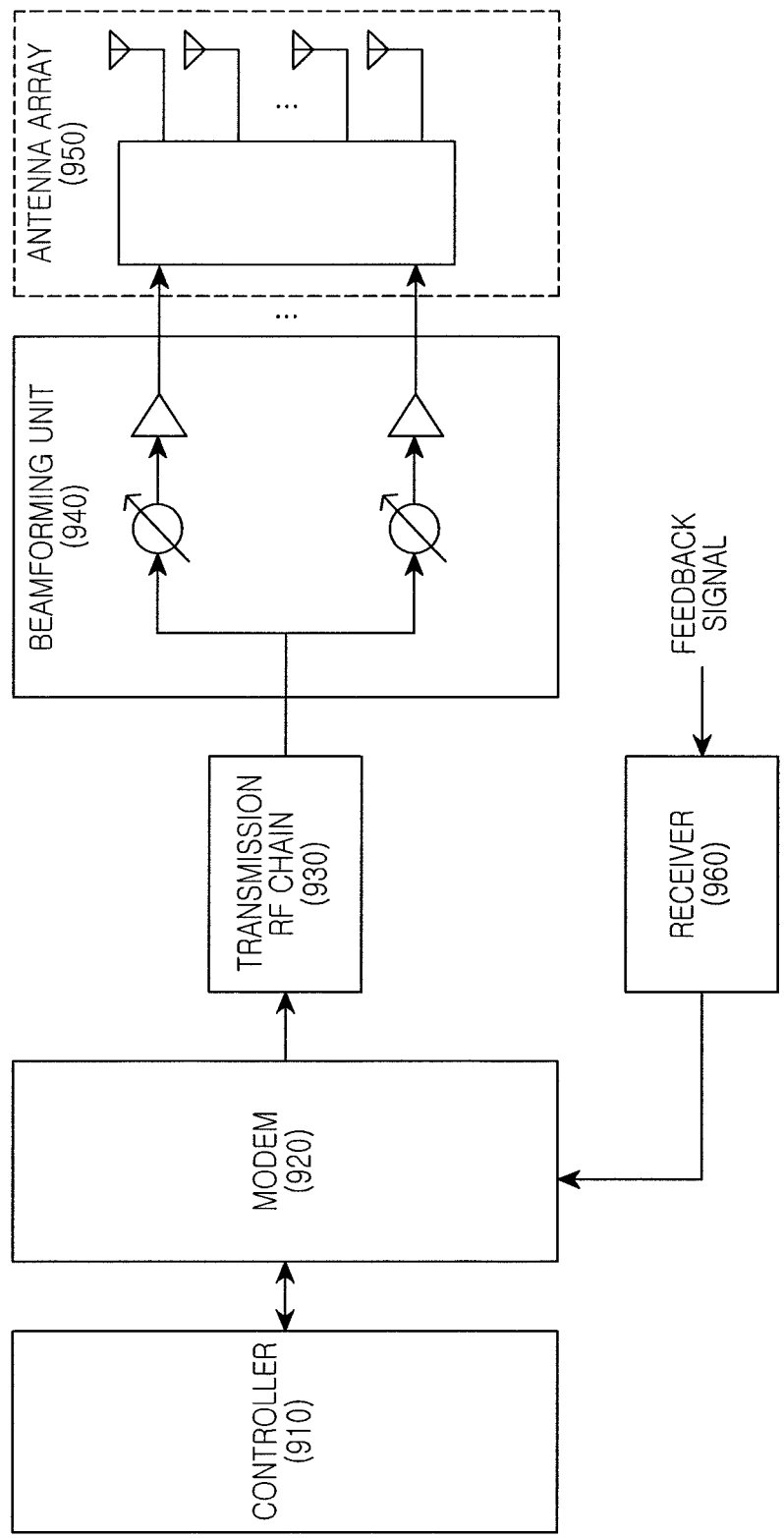
FIG. 9 is a block diagram illustrating a construction of a BS in a wireless communication system according to an exemplary embodiment of the present invention.

FIG. 9 illustrates a construction of a BS in a wireless communication system according to an exemplary embodiment of the present invention.

Referring to FIG. 9, the BS includes a controller 910, a modem 920, a transmission Radio Frequency (RF) chain 930, a beamforming unit 940, an antenna array 950, and a receiver 960.

The modem 920 performs a function of conversion between a baseband signal and a bit stream according to the physical layer standard of the system. For example, according to an OFDM scheme, at data transmission, the modem 920 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the modem 920 divides a baseband signal in the unit of OFDM symbol, restores signals mapped to subcarriers through Fast Fourier Transform (FFT) operation, and restores a reception bit stream through demodulation and decoding. The receiver 960 converts an RF signal received from a terminal into a baseband digital signal. Although not illustrated in detail, the receiver 960 includes an antenna, a reception RF chain and the like.

The transmission RF chain 930 converts a baseband digital signal stream provided from the modem 920 into an RF band analog signal. For instance, the transmission RF chain 930 can include an amplifier, a mixer, an oscillator, a Digital to Analog Converter (DAC), a filter, and the like. The BS can simultaneously form as many transmission beams as the number of the transmission RF chains 930.

The beamforming unit 940 performs transmit beamforming for a transmission signal provided from the transmission RF chain 930. For example, the beamforming unit 940 includes a plurality of phase converters, a plurality of amplifiers, and a signal summing unit. That is, the beamforming unit 940 divides a transmission signal provided from each of the transmission RF chains 930 as many as a plurality of antennas included in the antenna array 950, and adjusts a phase of each of the divided signals. Also, the beamforming unit 940 sums up signals to be transmitted by the same antenna. The antenna array 950 is a set of the plurality of antennas, and includes a plurality of array elements and radiates signals provided from the beamforming unit 940 over a wireless channel.

The controller 910 controls a general operation of the BS. For example, the controller 910 generates and provides a transmission traffic packet and a message to the modem 920, and interprets a reception traffic packet and a message provided from the modem 920. Particularly, the controller 910 controls to perform a beam acquisition procedure. An operation of the controller 910 for the beam acquisition procedure is described as follows.

The controller 910 determines if terminals are uniformly distributed within the service coverage of the BS. When the terminals are uniformly distributed within the service coverage of the BS, the controller 910 controls the modem 920 and the beamforming unit 940 to repeatedly transmit narrow beam reference signals in all directions within the service coverage. In contrast, when the terminals are randomly distributed within the service coverage of the BS, the controller 910 controls the modem 920 and the beamforming unit 940 to repeatedly transmit wide beam reference signals in all directions within the service coverage. And, the controller 910 determines a direction range that is to transmit narrow beam reference signals depending on preferred-wide beams of terminals and then, controls the modem 920 and the beamforming unit 940 to transmit the narrow beam reference signals within the determined range. And, the controller 910 confirms preferred-wide beams that the terminals prefer and preferred-narrow beams that the terminals prefer, through a feedback signal received through the receiver 960.

When transmitting the narrow beam reference signals, the controller 910 determines transmission patterns of the narrow beam reference signals. For example, as illustrated in FIG. 4 and FIG. 5, when measurement durations during which narrow beam reference signals are transmitted are continuous irrespective of the results of selection of preferred-wide beams, the controller 910 determines the number of measurement durations that are to transmit the narrow beam reference signals, depending on the number of preferred-wide beams of at least one terminal. And, the controller 910 allocates the continuous measurement durations to the preferred-wide beams, and determines to transmit narrow beam reference signals through a measurement duration allocated to a corresponding preferred-wide beam. For another example, as illustrated in FIG. 6, when the distribution of measurement durations during which narrow beam reference signals are transmitted becomes different depending on the results of selection of preferred-wide beams, the controller 910 confirms a position of at least one measurement duration corresponding to a preferred-wide beam of at least one terminal according to a predefined corresponding relationship therebetween, and determines to transmit narrow beam reference signals through a measurement duration corresponding to a corresponding preferred-wide beam. After determining the transmission patterns of the narrow beam reference signals, the controller 910 transmits beam pattern information notifying the transmission patterns of the narrow beam reference signals. However, when a corresponding relationship between a preferred-wide beam and a measurement duration is predefined, transmission of the beam pattern information can be omitted.

Figure 10:
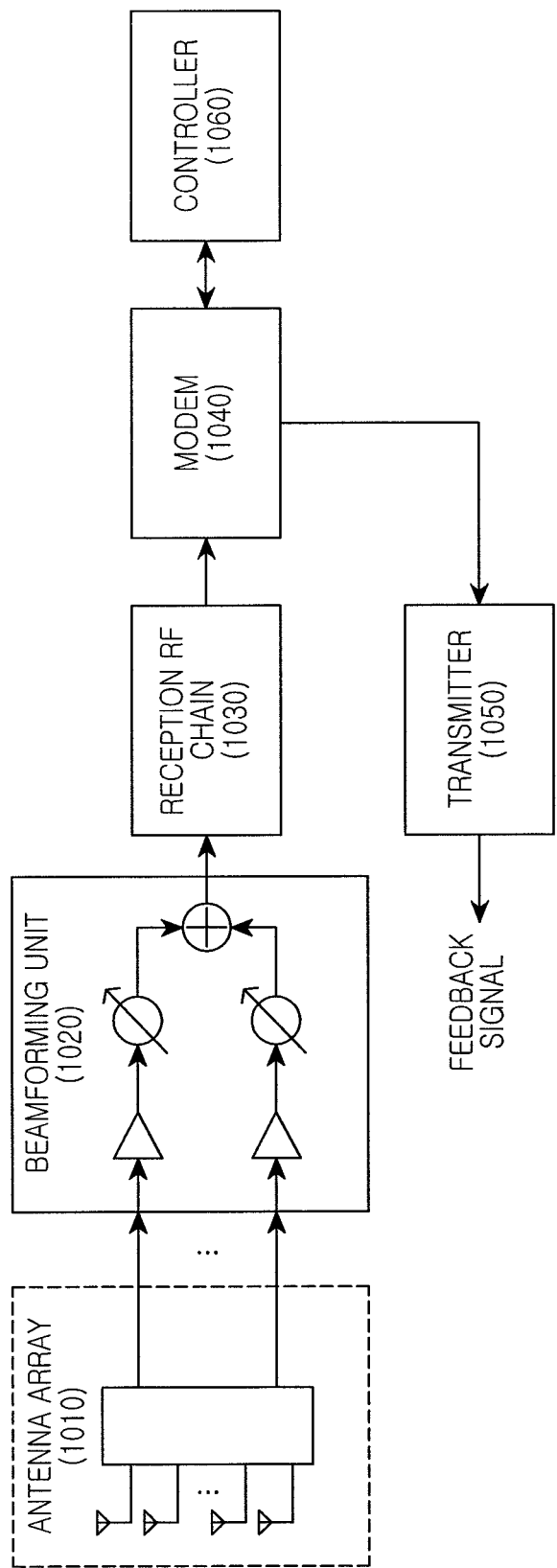
FIG. 10 is a block diagram illustrating a construction of a terminal in a wireless communication system according to an exemplary embodiment of the present invention.

FIG. 10 illustrates a construction of a terminal in a wireless communication system according to an exemplary embodiment of the present invention.

As illustrated in FIG. 10, the terminal includes an antenna array 1010, a beamforming unit 1020, a reception RF chain 1030, a modem 1040, a transmitter 1050, and a controller 1060.

The antenna array 1010 is a set of a plurality of antennas, and includes a plurality of array elements. The beamforming unit 1020 performs receive beamforming for signals received through the plurality of antennas constructing the antenna array 1010. For example, the beamforming unit 1020 includes a plurality of amplifiers, a plurality of phase converters, and a signal summing unit. For example, the beamforming unit 1020 adjusts and sums up phases of the signals received through the plurality of antennas, thereby performing the receive beamforming. The reception RF chain 1030 converts an RF-band analog reception signal into a baseband digital signal. For example, the reception RF chain 1030 can include an amplifier, a mixer, an oscillator, an Analog to Digital Converter (ADC), a filter, and the like.

The modem 1040 performs a function of conversion between a baseband signal and a bit stream according to the physical layer standard of the system. For example, according to an OFDM scheme, at data transmission, the modem 1040 creates complex symbols by encoding and modulating a transmission bit stream, maps the complex symbols to subcarriers, and then constructs OFDM symbols through IFFT operation and CP insertion. Also, at data reception, the modem 1040 divides a baseband signal provided from the reception RF chain 1030 in the unit of OFDM symbol, restores signals mapped to subcarriers through FFT operation, and restores a reception bit stream through demodulation and decoding.

Particularly, the modem 1040 measures a reception signal strength for reference signals received from a BS. In detail, the modem 1040 detects wide beam reference signals and narrow beam reference signals received from the BS, measures a reception signal strength for each of the reference signals, and then provides the measured reception signal strengths of the reference signals to the controller 1060. At this time, the modem 1040 detects the narrow beam reference signals according to control of the controller 1060. For example, when confirming a measurement duration allocated to a preferred-wide beam using beam pattern information provided from the BS, the modem 1040 can detect narrow beam reference signals only during the measurement duration, and measure reception signal strengths of narrow beam reference signals. Also, when confirming a measurement duration allocated to a preferred-wide beam according to a predefined corresponding relationship therebetween, the modem 1040 can detect narrow beam reference signals only during the measurement duration, and measure reception signal strengths of the narrow beam reference signals. Also, when confirming only the number of narrow beam reference signals through the beam pattern information, the modem 1040 can detect all the narrow beam reference signals during a measurement duration corresponding to the number of narrow beam reference signals, and measure reception signal strengths of the narrow beam reference signals.

The transmitter 1050 converts a transmission signal provided from the modem 1040 into an RF band signal and transmits the RF band signal to the BS. Although not illustrated in detail, the transmitter 1050 includes a transmission RF chain, an antenna and the like.

The controller 1060 controls a general function of the terminal. For instance, the controller 1060 generates and provides a transmission traffic packet and a message to the modem 1040, and interprets a reception traffic packet and a message provided from the modem 1040. Particularly, the controller 1060 controls to perform a beam acquisition procedure. An operation of the controller 1060 for the beam acquisition procedure is described as follows.

The controller 1060 determines a preferred-wide beam and a preferred-narrow beam using reception signal strengths of wide beam reference signals and narrow beam reference signals received from the BS. And, the controller 1060 transmits a feedback signal notifying the preferred-wide beam and a feedback signal notifying the preferred-narrow beam, to the BS through the transmitter 1050. Particularly, the controller 1060 confirms transmission patterns of narrow beam reference signals, for the sake of detection of the narrow beam reference signals. According to an exemplary embodiment of the present invention, the controller 1060 can determine transmission patterns of narrow beam reference signals depending on beam pattern information provided from the BS. In detail, the controller 1060 receives the beam pattern information notifying the transmission patterns of the narrow beam reference signals from the BS and, through the beam pattern information, determines the number of narrow beam reference signals to be transmitted. And, the controller 1060 confirms a measurement duration allocated to the preferred-wide beam through the beam pattern information. Here, the measurement duration allocated to the preferred-wide beam is determined according to the order of an index of a preferred-wide beam that the terminal prefers among the whole preferred-wide beams. According to another exemplary embodiment of the present invention, the controller 1060 confirms a measurement duration corresponding to a preferred-wide beam according to a predefined corresponding relationship therebetween. In detail, the controller 1060 is aware of a predefined corresponding relationship between a preferred-wide beam and a measurement duration irrespective of the number and direction of preferred-wide beams and, according to this, the controller 1060 can confirm a corresponding measurement duration according to the order of an index of a preferred-wide beam that the terminal prefers among the whole preferred-wide beams.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The present invention may be implemented in an electronic device including a portable terminal such as, for example, a smart phone and a mobile telecommunication terminal. Hereunder, a portable terminal is used as an example for the electronic device.

As described above, exemplary embodiments of the present invention determine transmission ranges of reference signals beamformed with narrow beams for high gain using a wide beam inducing a relatively less overhead, thereby being able to determine the best beam by a minimum overhead.

While the invention has been shown and described with reference to certain preferred embodiments thereof, it will be understood by those skilled in the art that various turns in form and details may be made therein without departing from the spirit and scope of the invention as defined by the appended claims and their equivalents.

What is claimed is:

1. A method performed by a terminal in a wireless communication system, the method comprising:
   receiving, from a base station, synchronization signals using a plurality of transmission of beams of the base station;
   receiving, from the base station, information for a reference signal after receiving the synchronization signals, the information for the reference signal including:
   information on resources of one or more reference signals, and
   information on an index for indicating a synchronization signal among the synchronization signals;
   receiving, from the base station, one or more reference signals based on the information for the reference signal after receiving the information for the reference signal; and
   transmitting, to the base station, feedback information indicating an index of a reference signal among the received one or more reference signals.

2. The method of claim 1, wherein the information on the resources comprises:
   information for indicating a number of the one or more reference signals in a duration; and
   information on a number of durations in which the one or more reference signals are received.

3. The method of claim 1, wherein the one or more reference signals are associated with a transmission beam corresponding to the indicated synchronization signal among the plurality of transmission of beams of the base station.

4. The method of claim 1, further comprising:
   identifying a measurement duration corresponding to the index for the synchronization signal based on predefined information on a relationship between the plurality of transmission beams of the synchronization signals and a frame.

5. The method of claim 1,
   wherein the synchronization signals correspond to a first beam width,
   wherein the one or more reference signals correspond to a second beam width, and
   wherein the first beam width is wider than the second beam width.

6. A method performed by a base station in a wireless communication system, the method comprising:

transmitting, to a terminal, synchronization signals with a plurality of transmission of beams of the base station, transmitting, to the terminal, information for a reference signal after transmitting synchronization signals, the information for the reference signal including:
information on resources of one or more reference signals, and
information on an index for indicating a synchronization signal among the synchronization signals;

transmitting, to the terminal, one or more reference signals based on the information for the reference signal after transmitting the information for the reference signal; and receiving, from the terminal, feedback information indicating an index of a reference signal among the transmitted one or more reference signals.

7. The method of claim 6, wherein the information on the resources comprises:
information for indicating a number of the one or more reference signals in a duration; and
information on a number of durations in which the one or more reference signals are transmitted.

8. The method of claim 6, wherein the one or more reference signals are associated with a transmission beam corresponding to the indicated synchronization signal among the plurality of transmission of beams of the base station.

9. The method of claim 6, further comprising:
identifying a measurement duration corresponding to the index for the synchronization signal based on predefined information on a relationship between the plurality of transmission beams of the synchronization signals and a frame.

10. The method of claim 6,
wherein the synchronization signals correspond to a first beam width,
wherein the one or more reference signals correspond to a second beam width, and
wherein the first beam width is wider than the second beam width.

11. A terminal in a wireless communication system, the terminal comprising:
at least one transceiver; and
at least one processor configured to:
receive, from a base station via the at least one processor, synchronization signals using a plurality of transmission of beams of the base station,
receive, from the base station via the at least one transceiver, information for a reference signal, after receiving the synchronization signals, the information for the reference signal including:
information on resources of one or more reference signals, and
information on an index for indicating a synchronization signal among the synchronization signals,
receive, from the base station via the at least one transceiver, one or more reference signals based on the information for the reference signal after receiving the information for the reference signal, and
transmit, to the base station via the at least one transceiver, feedback information indicating an index of a reference signal among the received one or more reference signals.

12. The terminal of claim 11, wherein the information on the resources comprises:
information for indicating a number of the one or more reference signals in a duration; and
information on a number of durations in which the one or more reference signals are received.

13. The terminal of claim 11, wherein the one or more reference signals are associated with a transmission beam corresponding to the indicated synchronization signal among the plurality of transmission of beams of the base station.

14. The terminal of claim 11, wherein the at least one processor is further configured to:
identify a measurement duration corresponding to the index for the synchronization signal based on predefined information on a relationship between the plurality of transmission beams of the synchronization signals and a frame.

15. The terminal of claim 11,
wherein the synchronization signals correspond to a first beam width,
wherein the one or more reference signals correspond to a second beam width, and
wherein the first beam width is wider than the second beam width.

16. A base station in a wireless communication system, comprising:
at least one transceiver; and
at least one processor configured to:
transmit, to a terminal via the at least one processor, synchronization signals with a plurality of transmission of beams of the base station,
transmit, to the terminal via the at least one transceiver, information for a reference signal after transmitting synchronization signals, the information for the reference signal including:
information on resources of one or more reference signals, and
information on an index for indicating a synchronization signal among the synchronization signals;
transmit, to the terminal via the at least one transceiver, one or more reference signals based on the information for the reference signal after transmitting the information for the reference signal; and
receive, from the terminal via the at least one transceiver, feedback information indicating an index of a reference signal among the transmitted one or more reference signals.

17. The base station of claim 16, wherein the information on the resources comprises:
information for indicating a number of the one or more reference signals in a duration; and
information on a number of durations in which the one or more reference signals are transmitted.

18. The base station of claim 16, wherein the one or more reference signals are associated with a transmission beam corresponding to the indicated synchronization signal among the plurality of transmission of beams of the base station.

19. The base station of claim 16, wherein the at least one processor is further configured to:
identify a measurement duration corresponding to the index for the synchronization signal based on predefined information on a relationship between the plurality of transmission beams of the synchronization signals and a frame.

20. The base station of claim 16,
wherein the synchronization signals correspond to a first beam width,
wherein the one or more reference signals correspond to a second beam width, and wherein the first beam width is wider than the second beam width.

* * * * *